UNITED STATES PATENT OFFICE.

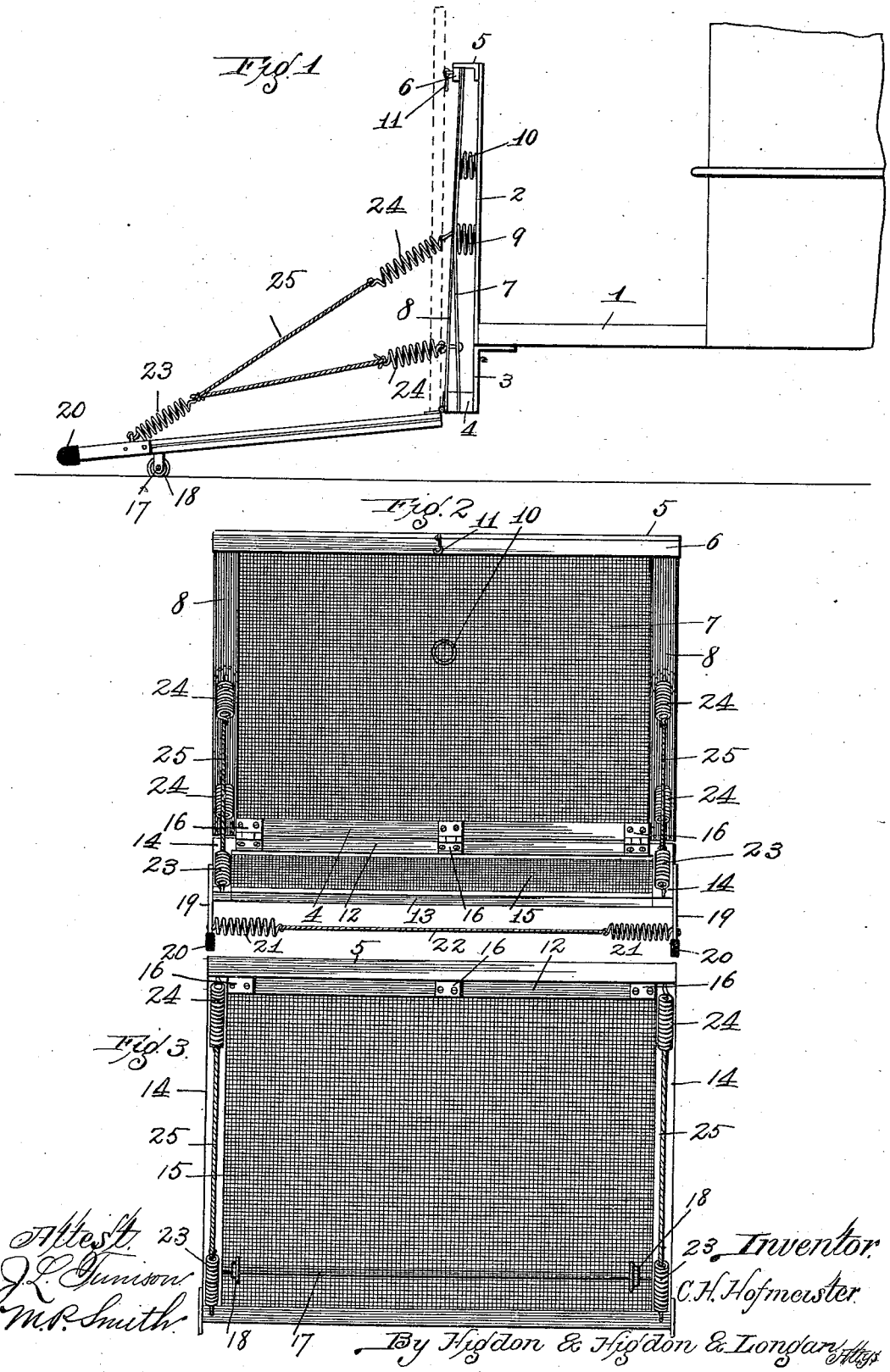

CHARLES HENRY HOFMEISTER, OF ST. LOUIS, MISSOURI.

CAR-FENDER.

SPECIFICATION forming part of Letters Patent No. 548,164, dated October 15, 1895.

Application filed August 15, 1895. Serial No. 559,435. (No model.)

*To all whom it may concern:*

Be it known that I, CHARLES HENRY HOFMEISTER, of the city of St. Louis, State of Missouri, have invented certain new and useful Improvements in Car-Fenders, of which the following is a full, clear, and exact description, reference being had to the accompanying drawings, forming a part hereof.

My invention relates to an improved car-fender; and it consists in the novel construction, combination, and arrangement of parts hereinafter described and claimed.

In the drawings, Figure 1 is a side elevation of the front portion of a car having my improved fender applied thereto. Fig. 2 is a front elevation of the fender. Fig. 3 is a top plan view thereof.

Referring by numerals to the accompanying drawings, 1 indicates the car-platform and 2 the dashboard at the front edge thereof. Fixed to the under side and forward end of the platform 1 and depending therefrom are angle-brackets, such as 3, and fixed to the lower ends of said brackets and extending transversely across the under side of the platform is a bar 4. Fixed to the outer face and upper edge of the dashboard 2 and extending transversely of the same is an angle iron or bar 5, to the outer end of which is fixed a depending wooden bar 6. Fixed to the rear side of this wooden bar 6 is the upper edge of a section of netting 7, preferably of wire, the same covering the entire front face of the dashboard 2, and the lower edge of said section of netting is fixed in any suitable manner to the transverse bar 4. Arranged upon the front face of this section of netting 7 and at the side edges thereof are strips of rubber 8 or other flexible material, the top ends of which are secured to the bar 6 and the lower ends of which are secured to the front of the bar 4.

Interposed between the netting 7 and the dashboard 2 and at the side edges thereof are expansive coil-springs 9, the same being located at points approximately half way between the bar 4 and the top edge of the dashboard. An expansive coil-spring 10 is interposed between the netting 7 and the dashboard 2 at a point approximately in the center of said section of netting, but in a plane slightly above the plane occupied by the coil-springs 9. A hook 11 is secured in any suitable manner to the center of the bar 6.

A rectangular framework comprises a rear bar 12, front bar 13, and side bars 14, and said rectangular framework is covered with a section of netting 15. Ordinary strap-hinges 16 are fixed upon the front face of the transverse bar 4 and the top face of the rear bar 12 of the rectangular framework, thus hinging said rectangular framework to the vertically-arranged and stationary portion of the fender.

Arranged for rotation in suitable bearings, fixed to the under sides of the forward ends of the side bars 14, is a shaft 17, upon which are journaled wheels 18, that are intended to ride directly upon the track-rails. Fixed to the forward ends of the side bars 14 and extending forward therefrom are bars 19, upon the forward ends of which are located blocks of rubber 20 or analogous flexible material. Fixed to the inner faces of the forward ends of the bars 19 are the outer ends of retractile coil-springs 21, to the inner ends of which are attached the ends of a flexible cord or cable 22.

Fixed to the top faces and outer ends of the side bars 14 are the rear ends of retractile coil-springs 23.

Fixed to each side of the section of wire-netting 7 are the rear ends of a pair of retractile coil-springs 24. The forward ends of each pair of these coil-springs 24 are attached to the rear ends of flexible cords or cables 25, the forward ends of which are attached to the rear ends of the retractile coil-springs 23.

When a fender of my improved construction is in use upon a car, the various parts are in position, as shown in Fig. 1, the wheels 18 riding directly upon the track-rails. Thus the forward end of the fender is always carried at the same height relative the track-rails. Should the cord or cable 22 strike an object, such as a cobble-stone or a slight elevation in the road-bed, the coil-springs 21 will readily yield and said cord 22 will pass over the obstruction in such a manner as to slightly elevate the forward end of the horizontal and folding portion of the fender, thus allowing the same to ride over said obstruction and not contact therewith. Should the fender strike a body, such as that of a person or animal, the flexible cord or cable 22 will first engage with said body and thereby break the force of the contact of said fender with said body. Should the body be in an upright position, the forward movement of the fender will cause said body to fall directly upon the horizontal portion thereof, and should the body be lying upon the track said fender will pick the body up and carry the same until the car is stopped. Should the body be struck by the side of the fender, the force of contact of said fender with the body will be broken by the flexibility of the cords or cables 25, which will readily yield, as they are connected to the retractile coil-springs 23 and 24. The force of contact of the body with the dashboard of the car is broken owing to the interpositioning of the springs 9 and 10 between the section of netting 7 and said dashboard.

When it is desired to raise and fold the fender when not in use, the operator manually grasps the front bar 13 of the rectangular framework and lifts the same upwardly. The entire rectangular frame may thus be folded upwardly, as it swings on the hinges 16 and it is raised until it is in an approximate vertical position, or as that shown by dotted lines in Fig. 1. The hook 11 is now engaged over the front bar 13, or to an eye attached thereto, and this holds the folded portion of the fender in its closed position.

A car-fender of my improved construction possesses superior advantages in point of simplicity, durability, and general efficiency. The forward end, when not in use, always travels in the same plane and elevation relative the track-rails, and said fender may be easily and quickly folded when not in use into a comparatively small space upon the end or dashboard of the car to which it is attached.

I claim—

1. An improved car-fender, comprising angle-irons depending from the car-platform, a transverse bar fixed to said angle-irons, a bar carried by the upper end of the dashboard of the car, a section of netting fixed at its upper edge to the top bar and at its lower edge to the lower bar, straps of rubber or analogous material located upon the side edges of said section of netting, expansive coil-springs interposed between said section of netting and the dashboard, a rectangular frame-work covered with netting hinged to the lower bar, wheels journaled beneath the forward end of said frame-work that ride upon the track-rails, bars extending forward from said rectangular frame-work, a flexible yielding cord or cable connecting the forward end of said bars, and flexible yielding cords or cables arranged between the sides of the stationary and folding portions of the fender.

2. In an improved car-fender, a section of netting arranged to cover the dashboard of the car, coil-springs interposed between said section of netting and said dashboard, a bar extending transversely along the lower edge of the section of netting, a rectangular frame-work hinged to said bar and extending forward therefrom, wheels journaled beneath the forward end of said rectangular frame-work, and flexible connections between the sides of the rectangular frame-work and the section of netting that covers the dashboard.

3. In an improved car-fender, the combination of a section of netting arranged to cover the dashboard, expansive coil-springs interposed between said section of netting and the dashboard, a bar arranged along the lower edge of said section of netting, a rectangular frame-work covered with netting hinged to said bar, bars extending forward from the forward corners of said rectangular frame-work, retractile coil-springs secured to the outer ends of said bars, and a flexible cord or cable attached to the ends of said retractile coil-springs.

4. In an improved car-fender, the combination of a section of netting arranged to cover the dashboard of a car, expansive coil-springs arranged between said netting and the dashboard, a bar extending transversely across the lower edge of said section of netting, and strips of rubber or analogous material arranged upon the face and at the side edges of said section of netting, a rectangular frame-work covered with netting hinged to the transverse bar, wheels journaled beneath the forward end of said rectangular frame-work that ride directly upon the track-rails, retractile coil-springs fixed to the sides of the hinged frame-work, retractile coil-springs fixed to the sides of the section of netting and flexible cords or cables connecting the retractile coil-springs on the rectangular frame-work with the springs on the edges of the netting.

In testimony whereof I affix my signature in presence of two witnesses.

CHARLES HENRY HOFMEISTER.

Witnesses:
HENRY HOFMEISTER,
MATH DENNER.